US010455424B1

(12) United States Patent
Lee et al.

(10) Patent No.: US 10,455,424 B1
(45) Date of Patent: Oct. 22, 2019

(54) SYSTEM FOR OUT-OF-BAND ASSET TRACKING VIA A 5G NETWORK

(71) Applicant: Bank of America Corporation, Charlotte, NC (US)

(72) Inventors: Jisoo Lee, Cortlandt Manor, NY (US); Todd Michael Goodyear, New Hope, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/284,148

(22) Filed: Feb. 25, 2019

Related U.S. Application Data

(60) Provisional application No. 62/778,416, filed on Dec. 12, 2018.

(51) Int. Cl.
| | |
|---|---|
| *H04W 12/12* | (2009.01) |
| *G06F 21/88* | (2013.01) |
| *H04W 12/10* | (2009.01) |
| *G06F 21/60* | (2013.01) |
| *H04W 24/00* | (2009.01) |
| *H04W 8/22* | (2009.01) |
| *H04W 12/06* | (2009.01) |

(52) U.S. Cl.
CPC ...... *H04W 12/1206* (2019.01); *G06F 21/602* (2013.01); *G06F 21/88* (2013.01); *H04W 8/22* (2013.01); *H04W 12/06* (2013.01); *H04W 12/1004* (2019.01); *H04W 12/1208* (2019.01); *H04W 24/00* (2013.01)

(58) Field of Classification Search
CPC ... H04W 12/1206; H04W 12/06; H04W 8/22; H04W 24/00; H04W 12/1004; H04W 12/1208; G06F 21/602; G06F 21/88; G06F 8/65; G06F 11/14; G06F 8/658; G06F 2221/033
See application file for complete search history.

(56) References Cited

U.S. PATENT DOCUMENTS

| | | |
|---|---|---|
| 6,353,406 B1 | 3/2002 | Lanzl et al. |
| 6,483,461 B1 | 11/2002 | Matheney et al. |
| 6,501,393 B1 | 12/2002 | Richards et al. |
| 6,670,909 B2 | 12/2003 | Kim |
| 6,762,712 B2 | 7/2004 | Kim |

(Continued)

*Primary Examiner* — Brandon J Miller
(74) *Attorney, Agent, or Firm* — Michael A. Springs; Moore & Van Allen PLLC; Seongun M. Hong

(57) ABSTRACT

Embodiments of the present disclosure provide a system for out-of-band asset tracking and management via a 5G network. Through the use of a secured 5G network, an entity system may connect to a 5G-enabled and powered device to perform management and configuration outside of the enterprise network, including such functions as authentication, validation, testing, updating, tracking, and other functions in a secure and efficient manner. The 5G-enabled device may be location-aware and may detect whether the device is inside or outside of a defined authorized location in order to facilitate elevation of management, trusts of system, configuration deployments, and the like. If the 5G-enabled device is located outside of the authorized location, the system may be triggered to remove, delete, and/or corrupt any proprietary data on the 5G-enabled device in order to enable protection of sensitive data and/or assets.

20 Claims, 2 Drawing Sheets

(56) References Cited

U.S. PATENT DOCUMENTS

| | | | |
|---|---|---|---|
| 6,812,824 B1 | 11/2004 | Goldinger et al. | |
| 6,906,625 B1 | 6/2005 | Taylor et al. | |
| 6,934,749 B1 | 8/2005 | Black et al. | |
| 6,963,727 B2 | 11/2005 | Shreve | |
| 7,062,455 B1 | 6/2006 | Tobey | |
| 7,252,230 B1 | 8/2007 | Sheikh et al. | |
| 7,664,756 B1 | 2/2010 | Felton et al. | |
| 7,747,738 B2 | 6/2010 | Ellisor, Jr. | |
| 8,504,683 B2 | 8/2013 | Ellisor, Jr. | |
| 9,143,504 B1* | 9/2015 | Shi | H04L 63/0823 |
| 9,692,459 B2 | 6/2017 | Maltsev et al. | |
| 9,813,408 B2 | 11/2017 | Hefter et al. | |
| 9,999,038 B2 | 6/2018 | Barzegar et al. | |
| 10,009,063 B2 | 6/2018 | Gerszberg et al. | |
| 10,277,437 B2 | 4/2019 | Feher | |
| 10,284,259 B2 | 5/2019 | Henry et al. | |
| 10,298,371 B2 | 5/2019 | Gerszberg et al. | |
| 2002/0116485 A1 | 8/2002 | Black et al. | |
| 2006/0031828 A1* | 2/2006 | Won | G06F 8/65 717/168 |
| 2009/0178124 A1* | 7/2009 | Manion | G06F 21/305 726/6 |
| 2012/0252405 A1* | 10/2012 | Lortz | G06F 8/60 455/410 |
| 2012/0272056 A1* | 10/2012 | Ganesan | H04L 63/0838 713/156 |
| 2014/0223175 A1* | 8/2014 | Bhatnagar | G09C 5/00 713/159 |
| 2017/0099079 A1* | 4/2017 | Gross | H04B 3/52 |
| 2017/0156169 A1* | 6/2017 | Lakshmi Narayanan | H04W 24/04 |
| 2017/0310661 A1* | 10/2017 | Tyagi | H04L 63/0823 |
| 2018/0092067 A1* | 3/2018 | Liu | H04W 76/14 |
| 2018/0115611 A1* | 4/2018 | Lear | H04L 67/125 |

* cited by examiner

US 10,455,424 B1

SYSTEM FOR OUT-OF-BAND ASSET TRACKING VIA A 5G NETWORK

PRIORITY CLAIM

This application claims priority to U.S. Provisional Application Ser. No. 62/778,416, filed Dec. 12, 2018, entitled SYSTEM FOR OUT-OF-BAND ASSET TRACKING VIA A 5G NETWORK, which is incorporated herein by reference in its entirety.

BACKGROUND

An entity having various computing systems within the enterprise environment may use out-of-band network channels to manage its devices. That said, conventional methods of out-of-band management typically include a shadow system that exists outside of the traditional communication channels, which introduces a number of technological challenges. For instance, the shadow system must often be separately secured to ensure prevent unauthorized access to sensitive information, which may in turn lead to computing inefficiencies and/or difficulties in maintaining the shadow system. Accordingly, there is a need for a more efficient way to perform out-of-band management.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a system for out-of-band asset tracking and management via a 5G network. Through the use of a secured 5G network, an entity system may connect to a 5G-enabled and powered device to perform management and configuration outside of the enterprise network. In other words, the 5G network may serve as a secure, standardized out-of-band network for the entity system. In particular, 5G technology may be used to perform such functions as authentication, validation, testing, updating, tracking, and other functions in a secure and efficient manner. The 5G-enabled device may be location-aware and may detect whether the device is inside or outside of a defined authorized location in order to facilitate elevation of management, trusts of system, configuration deployments, and the like. If the 5G-enabled device is located outside of the authorized location, the system may be triggered to remove, delete, and/or corrupt any proprietary data on the 5G-enabled device in order to enable protection of sensitive data and/or assets.

Accordingly, embodiments of the present disclosure provide a system for out-of-band asset tracking over a 5G network. The system comprises a memory device with computer-readable program code stored thereon; a communication device; and a processing device operatively coupled to the memory device and the communication device. The processing device is configured to execute the computer-readable program code to receive, over the 5G network, a request from a user device to access a 5G-enabled hardware device; authenticate the user device over the 5G network; query, via the 5G network, the 5G-enabled hardware device; determine that the 5G-enabled hardware device is online; receive a request from the user device to perform out-of-band management of the 5G-enabled hardware device, wherein the request comprises a first action with respect to the 5G-enabled hardware device; and perform the first action on the 5G-enabled hardware device.

In some embodiments, the first action comprises one or more validation functions, the one or more validation functions comprising hardware diagnostics, error checking, component function testing, performance benchmarking, firmware integrity checks, or software compatibility testing.

In some embodiments, the 5G-enabled hardware device comprises an internal power source, wherein the 5G-enabled hardware device is configured to remain powered on and connected to the 5G network.

In some embodiments, the first action comprises one or more real-time functions, the one or more real-time functions comprising performing software updates, real-time tracking, or software configuration, wherein the one or more real-time functions are performed when the 5G-enabled hardware device is in transit.

In some embodiments, the 5G-enabled hardware device is a router, smartphone, laptop, server, or IoT device, or any other system comprising hardware and/or software components.

In some embodiments, authenticating the user device over the 5G network comprises receiving authentication credentials from the user device, the authentication credentials comprising a username and password, biometric data, secured authentication tokens, or cryptographic keys.

In some embodiments, the first action is restricted based on an identity of the user.

Embodiments of the present disclosure also provide a computer program product for out-of-band asset tracking over a 5G network. The computer program product comprises at least one non-transitory computer readable medium having computer-readable program code portions embodied therein. The computer-readable program code portions comprise executable code portions for receiving, over the 5G network, a request from a user device to access a 5G-enabled hardware device; authenticating the user device over the 5G network; querying, via the 5G network, the 5G-enabled hardware device; determining that the 5G-enabled hardware device is online; receiving a request from the user device to perform out-of-band management of the 5G-enabled hardware device, wherein the request comprises a first action with respect to the 5G-enabled hardware device; and performing the first action on the 5G-enabled hardware device.

In some embodiments, the first action comprises one or more validation functions, the one or more validation functions comprising hardware diagnostics, error checking, component function testing, performance benchmarking, firmware integrity checks, or software compatibility testing.

In some embodiments, the 5G-enabled hardware device comprises an internal power source, wherein the 5G-enabled hardware device is configured to remain powered on and connected to the 5G network.

In some embodiments, the first action comprises one or more real-time functions, the one or more real-time functions comprising performing software updates, real-time tracking, or software configuration, wherein the one or more real-time functions are performed when the 5G-enabled hardware device is in transit.

In some embodiments, the 5G-enabled hardware device is a router, smartphone, laptop, server, or IoT device, or any other system comprising hardware and/or software components.

In some embodiments, authenticating the user device over the 5G network comprises receiving authentication credentials from the user device, the authentication credentials comprising a username and password, biometric data, secured authentication tokens, or cryptographic keys.

Embodiments of the present disclosure also provide a computer-implemented method for out-of-band asset tracking over a 5G network. The method comprises receiving, over the 5G network, a request from a user device to access a 5G-enabled hardware device; authenticating the user device over the 5G network; querying, via the 5G network, the 5G-enabled hardware device; determining that the 5G-enabled hardware device is online; receiving a request from the user device to perform out-of-band management of the 5G-enabled hardware device, wherein the request comprises a first action with respect to the 5G-enabled hardware device; and performing the first action on the 5G-enabled hardware device.

In some embodiments, the first action comprises one or more validation functions, the one or more validation functions comprising hardware diagnostics, error checking, component function testing, performance benchmarking, firmware integrity checks, or software compatibility testing.

In some embodiments, the 5G-enabled hardware device comprises an internal power source, wherein the 5G-enabled hardware device is configured to remain powered on and connected to the 5G network.

In some embodiments, the first action comprises one or more real-time functions, the one or more real-time functions comprising performing software updates, real-time tracking, or software configuration, wherein the one or more real-time functions are performed when the 5G-enabled hardware device is in transit.

In some embodiments, the 5G-enabled hardware device is a router, smartphone, laptop, server, or IoT device, or any other system comprising hardware and/or software components.

In some embodiments, authenticating the user device over the 5G network comprises receiving authentication credentials from the user device, the authentication credentials comprising a username and password, biometric data, secured authentication tokens, or cryptographic keys.

In some embodiments, the first action is restricted based on an identity of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
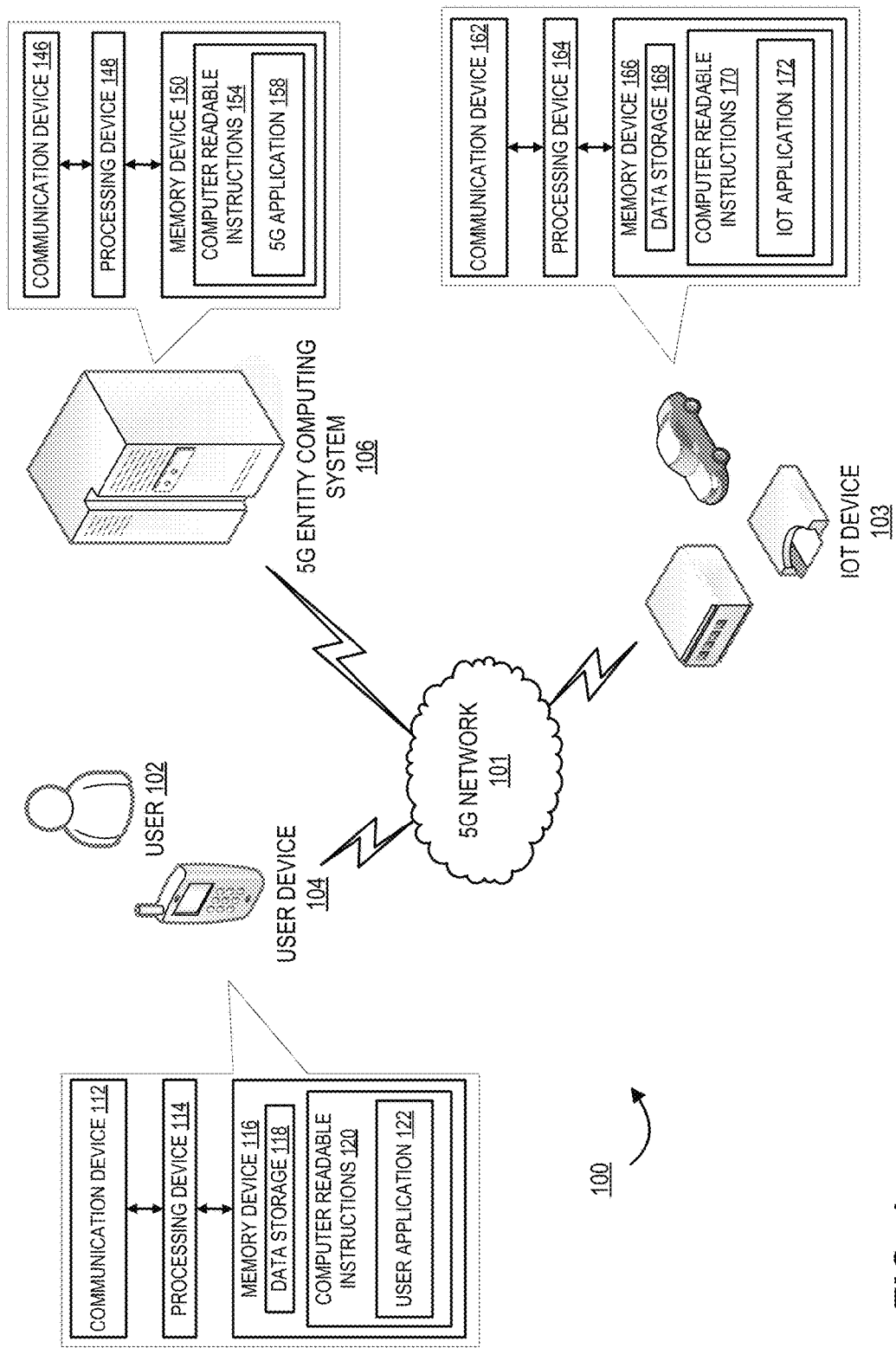
Figure 2:
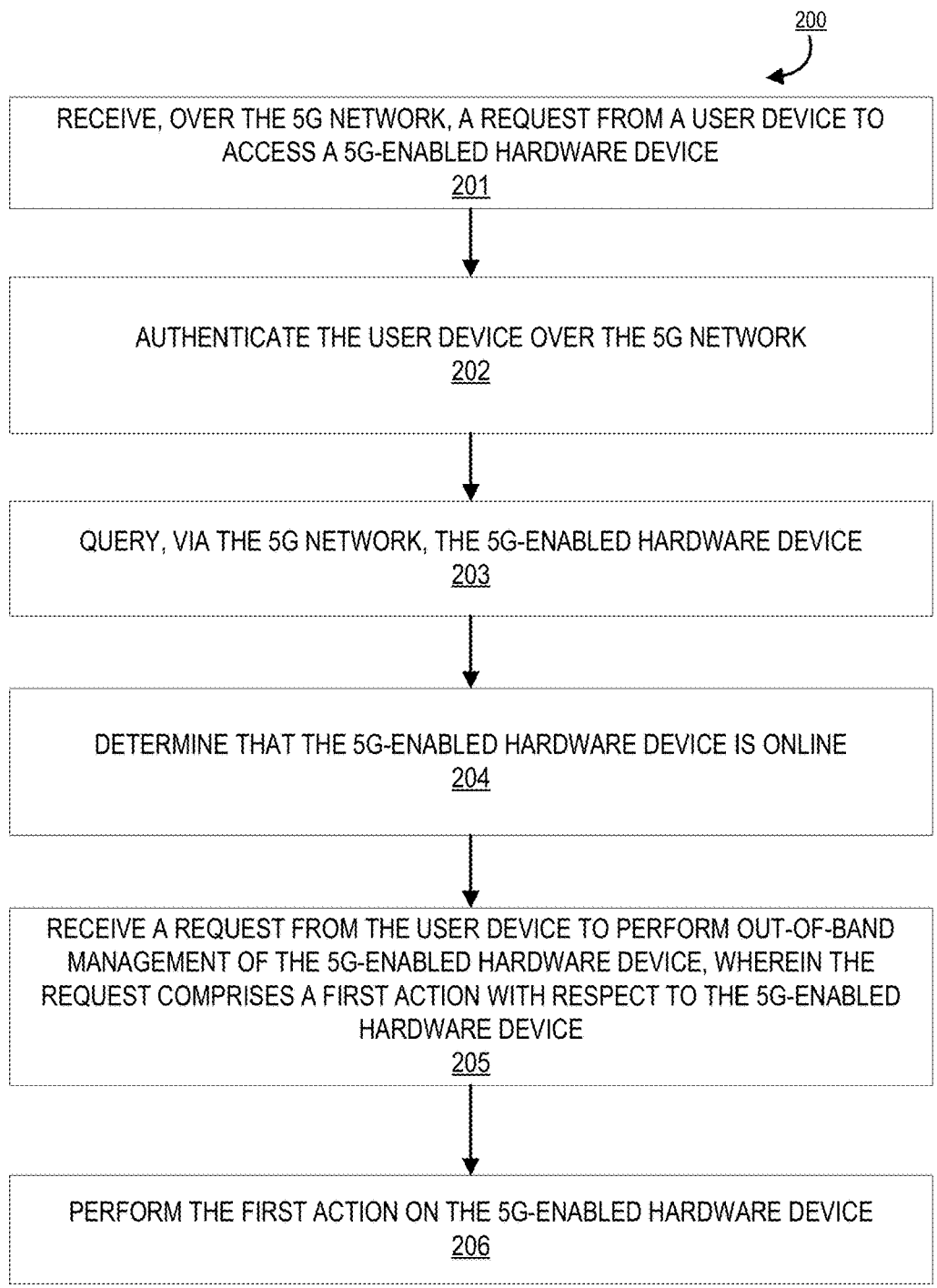

Having thus described embodiments of the invention in general terms, reference will now be made to the accompanying drawings, wherein:

FIG. 1 illustrates an operating environment for the out-of-band management system, in accordance with one embodiment of the present disclosure; and FIG. 2 illustrates a process flow for the out-of-band management system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, communications hardware, and/or other resources used by the entity to perform location-based data management. Accordingly, the entity system may comprise 5G cellular networks (e.g., 5G towers, transmitters, receivers, or the like), blockchain database servers, Internet-of-Things ("IoT") devices, networked terminals, mobile smartphones, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Service" as used herein includes any task, labor, product, or the like provided to a user from a third party service provider that may include a company, individual, or the like.

"Out-of-band" as used herein may refer to communications that occur outside of the standard communication channels within the enterprise environment. Accordingly, an "out-of-band network" comprises a series of communication channels that are disconnected and distinct from the main communication channels within the entity system. In some embodiments, the out-of-band network is configured for the express purpose of performing management of devices (e.g., the out-of-band network is a dedicated device management channel).

Within the enterprise context, an entity may desire to use a dedicated out-of-band network to perform management of computing devices. In particular, the out-of-band network may allow the entity (or user) to perform various functions with respect to a device, such as updating device firmware or software (e.g., BIOS, operating system, kernel, or the like), performing authentication or authorization, software customizations, modifying startup behavior, tracking device location, issuing commands (e.g., restart), requesting device status information (e.g., computing resource usage, power consumption, hardware and/or software error codes, operating temperature, or the like), or other functions.

By using a 5G network as the out-of-band network (e.g., in place of the out-of-band network) for asset management, the system may provide to an entity a dedicated, secured and authenticated channel for performing management of computing devices connected to the out-of-band network. Accordingly, said computing devices may be 5G-enabled devices which may be configured to accept inputs from and provide outputs to the entity and/or a user over the out-of-band network. In particular, the 5G-enabled device may be configured to be accessible by multiple types of users (e.g., an employee/administrator of the entity vs. a client of the entity or other third party) who may be using a 5G-enabled user device to access the out-of-band network.

The following exemplary use case is provided to illustrate the use of the system according to one embodiment of the present disclosure. In an exemplary embodiment, the user may purchase a hardware device (e.g., a smartphone, smart device, IoT device, routers or other wireless peripherals, or the like) from the entity. Once the device has been manufactured by the manufacturer, the device may be powered on to connect to the 5G out-of-band network. Once the device is powered on and online (e.g., through use of an internal battery and 5G communication interface), the device may become immediately available for management and/or configuration by the user. For instance, the user may perform validation and/or testing of the hardware device before the device is shipped to the user, thereby allowing the manufacturer to address hardware defects before the device leaves the premises. While the device is in transit, the device may be configured to accept further inputs from the user throughout the duration of the shipment. For instance, while the device is in route to the user, the user may continue to update firmware or software, perform software customizations (e.g., preload operating systems, software packages, or the like), track the location of the device in transit, perform initial setup and/or configuration (e.g., user/account setup, authentication credentials, device decryption/encryption, or the like), and the like. In this way, the device may be immediately ready for use upon delivery to the user.

The system as described herein confers a number of technological advantages over methods involving conventional out-of-band networks. For example, using a 5G network to perform device management allows for flexibility in performing management functions in that devices may be managed, tracked, authenticated, and/or configured even when in transit. Furthermore, the constantly online nature of the 5G-enabled device allows the device to be continuously tracked to establish a certifiable chain-of-custody in a secure manner.

Turning now to the figures, FIG. 1 illustrates an operating environment 100 for an entity 5G system, in accordance with one embodiment of the present invention. In particular, FIG. 1 illustrates a 5G entity computing system 106 that is operatively coupled, via a 5G network 101 to a user device 104 and/or an IoT device 103. In such a configuration, the 5G entity computing system 106 may transmit information to and receive information from the user device 104 and/or the IoT device 103. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The 5G network 101 may be a system specific distributive network receiving and distributing specific network feeds and identifying specific network associated triggers. The 5G network 101 include one or more 5G radio towers, antennae, cell sites, base stations, telephone networks, cloud networks, radio access networks (RAN), WiFi networks, or the like. Additionally, the 5G network 101 may also include a global area network (GAN), such as the Internet, a wide area network (WAN), a local area network (LAN), or any other type of network or combination of networks. Accordingly, the 5G network 101 may provide for wireline, wireless, or a combination wireline and wireless communication between devices on the 5G network 101.

The 5G network 101 as described herein confers many technological benefits over conventional network systems. For instance, the 5G network 101 may support network slicing to allow cellular service providers to generate virtualized cellular networks on a per-device basis, with each virtualized cellular network having certain defined features and performance standards. As a result, an entity may tailor the 5G network 101 to certain devices which may require higher bandwidth and/or lower latency connections than is available from conventional networks. Accordingly, the 5G network 101 may improve the efficiency and/or effectiveness of various processes in multiple different scenarios and use cases, as will be further described herein.

The user device 104 may be operated by a user 102. The user device 104 may be, for example, a portable device such as a cellular phone, smart phone, personal data assistant (PDA), laptop, or the like, though it is within the scope of the disclosure for the user device 104 to be a stationary device such as a desktop computer. The user device 104 generally comprises a communication device 112, a processing device 114, and a memory device 116. The processing device 114 is operatively coupled to the communication device 112 and the memory device 116. The processing device 114 uses the communication device 112 to communicate with the 5G network 101 and other devices on the 5G network 101, such as, but not limited to the 5G entity computing system 106. As such, the communication device 112 generally comprises a modem, antennae, WiFi or Ethernet adapter, radio transceiver, or other device for communicating with other devices on the 5G network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to receive communications from and/or send communications to the 5G entity computing system 106 and/or the IoT device 103. For instance, the user application 122 may allow the user 102 to access the IoT device 103 and perform customization of the IoT application 172 stored therein and/or perform various other configuration, management, and/or tracking functions as described elsewhere herein.

As further illustrated in FIG. 1, the 5G entity computing system 106 may comprise a communication device 146, a processing device 148, and a memory device 150. The 5G entity computing system 106 may be owned and/or operated by an entity such as a cellular service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the 5G network 101 and other devices on the 5G network 201, such as, but not limited to the user device 104 and/or the IoT device 103 generally comprises a modem, antennae, WiFi or Ethernet adapter, radio transceiver, or other device for communicating with other devices on the 5G network 101.

As further illustrated in FIG. 1, the 5G entity computing system 106 comprises computer-readable instructions 154 stored in the memory device 150, which in one embodiment includes the computer-readable instructions 154 of a 5G application 158. In some embodiments, the memory device 150 includes data storage 152 for storing data related to the system environment, but not limited to data created and/or used by the 5G application 150. The 5G application 158 may comprise computer-executable program code which may instruct the processing device 148 to perform certain logic, data processing, and data storing functions of the application to accomplish the entity's objectives. For example, the 5G application 158 may allow the entity to query, track, configure, or perform other types of communicative functions with the user device 104 and/or the IoT device 103.

In some embodiments, the operating environment may comprise one or more IoT devices 103. The IoT device 103 may refer to an appliance, vehicle, computing accessory, wearable device, or other type of smart device which may support 5G connectivity. Accordingly, the IoT device 103 may also comprise a processing device 164 operatively coupled to the communication device 162 and a memory device 166 comprising data storage 168 and computer readable instructions 170. The computer readable instructions 170 may comprise an IoT application 172 which may be configured to instruct the processing device 164 to execute certain functions over the 5G network 101, such as interacting with the 5G entity computing system 106 and/or the user device 104. In some embodiments, the IoT device 103 may be a device which is managed or configured out-of-band by the user device 104 and/or the 5G entity computing system 106 via the 5G network 101.

The communication device 162, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the IoT device 103 may also include a communication interface device that may be connected by a hardwire connection to the resource distribution device. The interface device may comprise a connector such as a USB, SATA, PATA, SAS or other data connector for transmitting data to and from the IoT device 103.

The user device 104 and the IoT device 103 may each further include a processing device communicably coupled to devices as a memory device, output devices, input devices, a network interface, a power source, a clock or other timer, a camera, a positioning system device, a gyroscopic device, one or more chips, and the like.

In some embodiments, the user device 104 and the IoT device 103 access one or more databases or datastores (not shown) to search for and/or retrieve information related to the service provided by the entity. The user device 104 and the IoT device 103 may also or alternatively access both a memory and/or datastore local to the user device 104 and/or the IoT device 103.

The processing devices as described herein may include functionality to operate one or more software programs or applications, which may be stored in the memory device. For example, a processing device may be capable of operating a connectivity program, such as a web browser application. In this way, the user device 104 and/or the IoT device 103 may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the user device 104 and/or the IoT device 103. Alternatively, the applications may be pre-installed and stored in a memory in a chip.

The chip may include the necessary circuitry to provide 5G support and/or integration within the devices depicted herein. Generally, the chip will include data storage which may include data associated with the service that the 5G entity computing system 106, user device 104 and the IoT device 103 may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network.

In this regard, the 5G entity computing system 106, the user device 104 and/or the IoT device 103 may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the user device 104 and/or the IoT device 103 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 202, may include any of a number of devices allowing the devices to receive data from a user 202, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The user device 104 and/or the IoT device 103 further comprise a gyroscopic device. The positioning system, input device, and the gyroscopic device may be used in correlation to identify phases within a service term.

In some embodiments, the user device 104 and/or the IoT device 103 may identify the activity associated with a service. The user device 104 and/or the IoT device 103 may do this via the gyroscopic device, positioning system device, camera, and the like. As such, the user device 104 and/or the IoT device 103 may identify when a product is being used, how often it is being used, the phase of the service, and the like.

As described above, the IoT device 103 may be one or more of various types of "smart devices." For example, the IoT device 103 may be a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of IoT devices 103 or smart devices provided herein is not exhaustive such that the IoT device 103 may be any device that includes a communication interface or module, software and/or hardware that allow the device to communicate data and/or information related to the device with other devices and/or systems over network.

The IoT device 103 may also have a control system for controlling the physical operation of the device. The control system may comprise one or more sensors for detecting operating conditions of the various mechanical and electrical systems that comprise the IoT device 103 or of the environment in which the IoT device 103 is used. The sensors may communicate with the processing device to provide feedback to the operating systems of the device. The control system may also comprise metering devices for measuring performance characteristics of the IoT device 103. The control system may also comprise controllers such as programmable logic controllers (PLC), proportional integral derivative controllers (PID) or other machine controllers. The IoT device 103 may also comprise various electrical, mechanical, hydraulic or other systems that perform various functions of the IoT device 103. These systems may comprise, for example, electrical circuits, motors, compressors, or any system that enables functioning of the IoT device 103.

FIG. 2 illustrates a process flow 200 for out-of-band asset tracking via a 5G network, in accordance with one embodiment of the present disclosure. The process may begin at block 201, where the system receives, over the 5G network, a request from a user device to access a 5G-enabled hardware device. Typically, the user device is a 5G-enabled device such as a smartphone, smart device, laptop, or the like. The 5G-enabled hardware device represents the device to be managed, tracked, and/or configured by the user and/or the entity. For instance, the 5G-enabled hardware device may be an entity-owned device such as a server, router, smartphone, laptop, IoT device, or the like, which may be configurable using an out-of-band method over the 5G network. In other embodiments, the hardware device may be an item or product to be delivered to the user (e.g., a hardware item purchased by the user or repaired at the user's request). Accordingly, the request to access the 5G-enabled hardware device typically comprises a request to perform out-of-band management on the 5G-enabled hardware device.

The process continues to block 202, where the system authenticates the user device over the 5G network. In some embodiments, the system may require the user to provide authentication credentials in order to perform out-of-band management. Examples of such authentication credentials may include a username and password, PIN, biometric data, secured authentication tokens, cryptographic keys, or the like. Once the user device has been authenticated by the entity system, the user device may be granted access to perform certain management functions with respect to the 5G-enabled hardware device. In some embodiments, the user device may be selectively granted authorization to perform certain functions, but not others. For example, if the user is a consumer or client of the entity, the user device may be authorized to perform tracking functions on the hardware device to monitor the location of the hardware device in transit, while the user device may be prevented from performing management functions that require root access to the hardware device. On the other hand, the user is an administrator or employee of the entity, the user device may be granted a less restrictive set of functions which may include low-level management or configuration functions.

The process continues to block 203, where the system queries, via the 5G network, the 5G-enabled hardware device. Typically, the 5G-enabled hardware device comprising an internal power source (e.g., a battery) and a 5G communication interface. Accordingly, the hardware device may be configured to stay powered on and connected to the 5G network for a period of time after the hardware device has been manufactured and/or repaired. By being constantly connected to the 5G network, the hardware device is available for configuration both before and after leaving the manufacturer in route to the user. In other embodiments, the 5G-enabled hardware device may be a device owned and operated by the entity which may be configured out-of-band through the 5G network. In such embodiments, the hardware device may be powered by a battery or wired connection (e.g., an outlet connected power supply).

The process continues to block 204, where the system determines that the 5G-enabled hardware device is online. The low-latency nature of the 5G network allows the system to query to hardware device to obtain real-time updates on the device's status. So long as the hardware device's power source (e.g., battery) continues to power the hardware device, the hardware device may remain online and available for communication with the user device and/or the entity system.

The process continues to block 205, where the system receives a request from the user device to perform out-of-band management of the 5G-enabled hardware device, wherein the request comprises a first action with respect to the 5G-enabled hardware device. At this stage, the user device may request that one or more various actions is performed on the hardware device. For instance, the first action may include validation or testing functions on the hardware device (e.g., hardware diagnostic and error checking, file system and/or firmware integrity checks, component function testing, performance benchmarking, software compatibility testing, or the like). Such actions may be taken before the hardware device is sent to the user, such that the facility in possession of the hardware device may be given an opportunity to make additional changes to the hardware device before shipping, if necessary.

In some embodiments, the user may be presented with a graphical interface (e.g., via an entity-provided application, a web interface, or the like) through which the user may issue commands to (and receive outputs from) the hardware device. In this regard, the graphical interface may comprise one or more input fields (e.g., text entry boxes, dialog boxes, radio buttons, clickable or touchable buttons, sliders, or the like) through which the user may provide input to the hardware device, as well as one or more output fields (e.g., notification windows, data visualization outputs, camera data, or the like). In other embodiments, the user may interact with the hardware device via a command-line interface.

In other embodiments, the first action may comprise steps taken after the hardware device has been sent to the user. For instance, the first action may comprise updating firmware or software, configuring settings, making software customizations, performing device encryption/decryption, or the like. The user may further be able to, in real-time, track the location of the device hardware as it travels to the user. By providing a user with "in flight" out-of-band management capabilities, the system may allow the user to prepare the device for immediate use upon arrival at the user's location.

The process concludes at block 206, where the system performs the first action on the 5G-enabled hardware device. The system may allow the user to execute actions on the hardware device so long as the device remains powered on and connected to the 5G network. Once the action has been executed, the system may report to the user that the action has been completed through the user interface. In this way, the system provides a secure and efficient way to perform out-of-band management of 5G-enabled hardware devices over a 5G network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for out-of-band asset tracking over a 5G network, the system comprising:
    a memory device with computer-readable program code stored thereon;
    a communication device; and
    a processing device operatively coupled to the memory device and the communication device, wherein the processing device is configured to execute the computer-readable program code to:
    receive, over the 5G network, a request from a user device to access a 5G-enabled hardware device;
    authenticate the user device over the 5G network;
    query, via the 5G network, the 5G-enabled hardware device;
    determine that the 5G-enabled hardware device is online;
    receive a request from the user device to perform out-of-band management of the 5G-enabled hardware device, wherein the request comprises a first action with respect to the 5G-enabled hardware device; and
    perform the first action on the 5G-enabled hardware device.

2. The system according to claim 1, wherein the first action comprises one or more validation functions, the one or more validation functions comprising hardware diagnostics, error checking, component function testing, performance benchmarking, firmware integrity checks, or software compatibility testing.

3. The system according to claim 1, wherein the 5G-enabled hardware device comprises an internal power source, wherein the 5G-enabled hardware device is configured to remain powered on and connected to the 5G network.

4. The system according to claim 1, wherein the first action comprises one or more real-time functions, the one or more real-time functions comprising performing software updates, real-time tracking, or software configuration, wherein the one or more real-time functions are performed when the 5G-enabled hardware device is in transit.

5. The system according to claim 1, wherein the 5G-enabled hardware device is a router, smartphone, laptop, server, or IoT device.

6. The system according to claim 1, wherein authenticating the user device over the 5G network comprises receiving authentication credentials from the user device, the authentication credentials comprising a username and password, biometric data, secured authentication tokens, or cryptographic keys.

7. The system according to claim 1, wherein the first action is restricted based on an identity of a user associated with the user device.

8. A computer program product for out-of-band asset tracking over a 5G network, the computer program product comprising at least one non-transitory computer readable medium having computer-readable program code portions embodied therein, the computer-readable program code portions comprising executable code portions for:

receiving, over the 5G network, a request from a user device to access a 5G-enabled hardware device;

authenticating the user device over the 5G network;

querying, via the 5G network, the 5G-enabled hardware device;

determining that the 5G-enabled hardware device is online;

receiving a request from the user device to perform out-of-band management of the 5G-enabled hardware device, wherein the request comprises a first action with respect to the 5G-enabled hardware device; and performing the first action on the 5G-enabled hardware device.

9. The computer program product of claim 8, wherein the first action comprises one or more validation functions, the one or more validation functions comprising hardware diagnostics, error checking, component function testing, performance benchmarking, firmware integrity checks, or software compatibility testing.

10. The computer program product of claim 8, wherein the 5G-enabled hardware device comprises an internal power source, wherein the 5G-enabled hardware device is configured to remain powered on and connected to the 5G network.

11. The computer program product of claim 8, wherein the first action comprises one or more real-time functions, the one or more real-time functions comprising performing software updates, real-time tracking, or software configuration, wherein the one or more real-time functions are performed when the 5G-enabled hardware device is in transit.

12. The computer program product of claim 8, wherein the 5G-enabled hardware device is a router, smartphone, laptop, server, or IoT device.

13. The computer program product of claim 8, wherein authenticating the user device over the 5G network comprises receiving authentication credentials from the user device, the authentication credentials comprising a username and password, biometric data, secured authentication tokens, or cryptographic keys.

14. A computer-implemented method for out-of-band asset tracking over a 5G network, the method comprising:

receiving, over the 5G network, a request from a user device to access a 5G-enabled hardware device;

authenticating the user device over the 5G network;

querying, via the 5G network, the 5G-enabled hardware device;

determining that the 5G-enabled hardware device is online;

receiving a request from the user device to perform out-of-band management of the 5G-enabled hardware device, wherein the request comprises a first action with respect to the 5G-enabled hardware device; and performing the first action on the 5G-enabled hardware device.

15. The computer-implemented method of claim 14, wherein the first action comprises one or more validation functions, the one or more validation functions comprising hardware diagnostics, error checking, component function testing, performance benchmarking, firmware integrity checks, or software compatibility testing.

16. The computer-implemented method of claim 14, wherein the 5G-enabled hardware device comprises an internal power source, wherein the 5G-enabled hardware device is configured to remain powered on and connected to the 5G network.

17. The computer-implemented method of claim 14, wherein the first action comprises one or more real-time functions, the one or more real-time functions comprising performing software updates, real-time tracking, or software configuration, wherein the one or more real-time functions are performed when the 5G-enabled hardware device is in transit.

18. The computer-implemented method of claim 14, wherein the 5G-enabled hardware device is a router, smartphone, laptop, server, or IoT device.

19. The computer-implemented method of claim 14, wherein authenticating the user device over the 5G network comprises receiving authentication credentials from the user device, the authentication credentials comprising a username and password, biometric data, secured authentication tokens, or cryptographic keys.

20. The computer-implemented method of claim 14, wherein the first action is restricted based on an identity of a user associated with the user devices.

* * * * *